Figure 1:
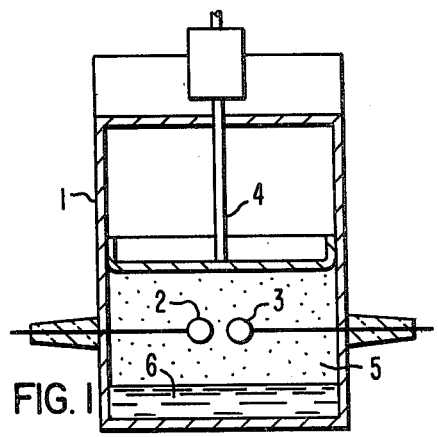

United States Patent [19]

Harrold

[11] 4,440,971
[45] Apr. 3, 1984

[54] SUPERSATURATED VAPOR DIELECTRICS

[75] Inventor: Ronald T. Harrold, Murrysville, Pa.

[73] Assignee: Electric Power Research Institute, Inc., Palo Alto, Calif.

[21] Appl. No.: 381,094

[22] Filed: May 24, 1982

[51] Int. Cl.³ .............................................. H01B 3/20
[52] U.S. Cl. .......................... 174/17 GF; 174/15 R; 174/17 R; 174/17 LF; 252/570; 252/571; 336/58; 336/94; 372/55
[58] Field of Search .............. 174/15 R, 17 R, 17 LF, 174/17 GF; 252/570, 571; 336/58, 94; 372/55

[56] References Cited

U.S. PATENT DOCUMENTS 4,162,227 7/1979 Cooke ................................... 252/571
4,296,003 10/1981 Harrold et al. ..................... 252/570

OTHER PUBLICATIONS

Raether, *Electron Avalanches and Breakdown in Gases*, Washington, Butterworths, 1964, p. 3.
Meek, "The Vital Spark," Proc. IEE, vol. 116, No. 1, Jan. 1969.

*Primary Examiner*—John E. Kittle
*Assistant Examiner*—Robert A. Wax
*Attorney, Agent, or Firm*—R. D. Fuerle

[57] ABSTRACT

Disclosed is an apparatus which is resistant to electrical breakdown consisting of a chamber containing electrodes separated by dielectric gas supersaturated with the vapor from a dielectric liquid.

12 Claims, 5 Drawing Figures

SUPERSATURATED VAPOR DIELECTRICS

BACKGROUND OF THE INVENTION

An important advance in gaseous dielectrics was recently made with the discovery that atomized dielectric liquids in a dielectric gas significantly increase the dielectric strength of the gas (see U.S. Pat. No. 4,296,003). The electrons and ions which precipitate an electrical breakdown appear to be captured by the droplets of the liquid dielectric, thereby retarding the breakdown. However, to maintain this additional breakdown strength, the continuous or intermittent operation of an atomizing process is necessary.

SUMMARY OF THE INVENTION

I have discovered that a substantially droplet-free vaporous dielectric of superior electrical breakdown strength results when a dielectric gas is supersaturated with the vapors of a liquid dielectric. Unlike a dielectric vapor which contains atomized droplets, the supersaturated dielectric vapor of this invention requires no atomizing process. Also, it can be maintained in a passive, low breakdown strength state until high dielectric strength is required. The supersaturated high dielectric strength state can then be almost immediately generated to meet the needs of the equipment. Alternatively, the supersaturated state can be continuously maintained if required. A variety of different dielectric gases and mixtures of dielectric gases or vapors can be used to create desirable vapor pressures at low and high temperatures or other desirable properties.

PRIOR ART

A book entitled "Electron Avalanches and Breakdown in Gases" by H. Raether (Butterworth & Company, 1964), page 3, discloses the study of electron avalanches in a cloud chamber "filled with a gas such as air, $N_2$, $H_2$, etc. [which] contains a liquid, for example water." The volume of the cloud chamber is expanded which lowers the temperature resulting in the vapor becoming supersaturated so that it condenses on positive and negative ions.

J. M. Meek, in an article entitled "The Vital Spark," Proceedings of the IEEE, Volume 116, No. 1, Jan. 1969, discusses electron avalanches photographed in cloud chambers containing nitrogen or air.

U.S. Pat. No. 4,162,227 discloses mixtures of insulating gases and vapors including sulfur hexafluoride and halocarbons.

U.S. Pat. No. 4,296,003 discloses a mixture of a dielectric gas, such as sulfur hexafluoride or nitrogen with an atomized dielectric liquid such as a halocarbon.

A book entitled "A Treatise on Heat," by M. N. Saha and B. N. Srivastava, pages 481 and 482, discloses that water droplets cannot form in supersaturated water vapor unless minute particles of dirt or ions are present to act as nuclei.

DESCRIPTION OF THE INVENTION

FIGS. 1 to 5 are diagrammatic side views in section illustrating three certain presently preferred embodiments of apparatus according to this invention.

Figure 2:
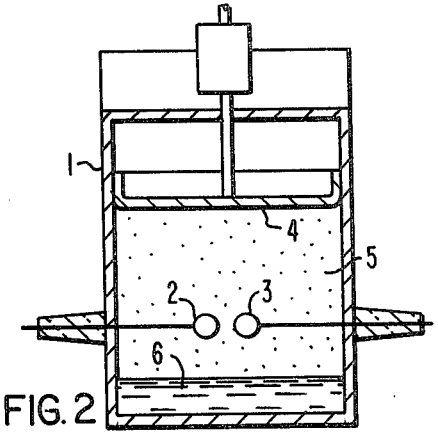

In FIGS. 1 and 2, a cylinder 1 contains electrodes 2 and 3 and piston 4. In FIG. 1, a dielectric gas 5 is saturated with the vapors of a dielectric liquid 6. In FIG. 2, the piston is raised, rapidly expanding the volume in the cylinder, lowering the temperature of the gas so that the gas is now supersaturated with the vapors of liquid 6. This apparatus can maintain a supersaturated atmosphere for a time duration of up to about one second.

Figure 3:
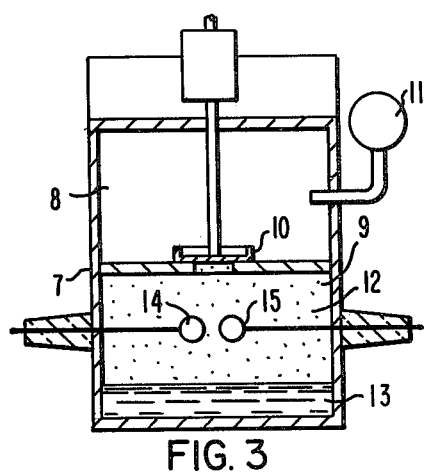
Figure 4:
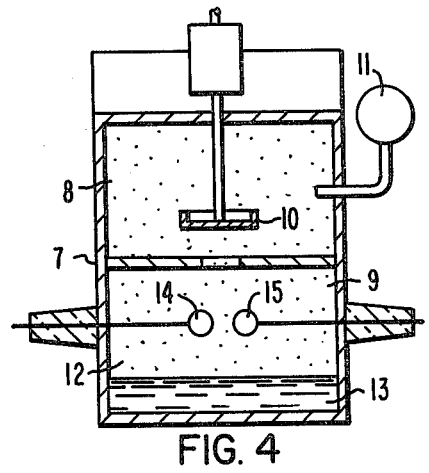

In FIGS. 3 and 4, a container 7 is divided into chambers 8 and 9 which are sealed from each other by valve 10. Chamber 8 is evacuated by vacuum pump 11. In chamber 9 a dielectric gas 12 saturated with vapors of dielectric liquid 13 fills the volume and the space between electrodes 14 and 15. When valve 10 is raised from its position in FIG. 3 to its position in FIG. 4, the pressure in chamber 9 falls rapidly which results in gas 12 being supersaturated with the vapors of liquid 13. This apparatus can maintain a supersaturated atmosphere for a time duration of up to about 20 seconds.

Figure 5:
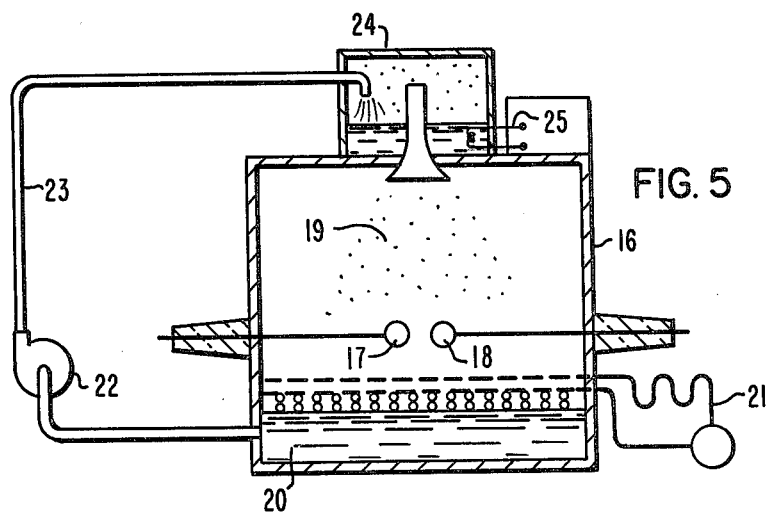

In FIG. 5, chamber 16 contains electrodes 17 and 18 and dielectric gas 19 supersaturated with the vapors of liquid 20 and cooled by refrigeration system 21. Pump 22 circulates liquid 20 through conduit 23 to chamber 24 where it is vaporized by heater 25 and it then enters chamber 16. As it enters, it is rapidly cooled, becoming supersaturated. This apparatus can maintain a continuous supersaturated atmosphere.

In the practice of this inventon, a dielectric gas is supersaturated with the vapors of a dielectric liquid. A substance is a dielectric if it can support an electric strain and differences of potential in it disappear very slowly or not at all because of current flow. The dielectric gas is a dielectric which is normally a gas at room temperature, and the dielectric liquid is a dielectric which is normally a liquid at room temperature, but the gas is supersaturated with vapor from the liquid during the operation of the electrical apparatus. The supersaturated state is unstable and instantly causes condensation of vapor from the liquid onto any particles which enter the dielectric gas.

The dielectric gas may be selected from a group consisting of electronegative gases, such as $SF_6$, $CCl_2F_2$, $C_2F_6$, $CF_3Cl$ and $CF_4$, and mixtures thereof; or from another group consisting of electropositive gases such as $N_2$ and $CO_2$, and mixtures thereof; or from mixtures of the two groups. A mixture of $SF_6$ and a halocarbon is preferred because this mixture has a high dielectric strength and a more uniform pressure over a wide temperature range. The dielectric liquid may be a chlorinated liquid such as $C_2Cl_4$ or a fluorocarbon liquid, such as $C_8F_{16}O$, or a mixture thereof. Fluorocarbons are preferred because they have been found to work well. It is preferable to use a mixture of dielectric gases or vapors because breakdown strength depends on the vapor pressure, and if a mixture of gases or vapors is used one can obtain a higher vapor pressure at low temperatures without producing a very high vapor pressure at high temperatures which necessitates an expensive vessel. A proportion of the gases or vapors in the mixture may be selected such that the vapor pressure at the maximum temperature is about 2 atmospheres or less, and the vapor pressure at the minimum operating temperature is as high as possible. The selection of gases and vapors to obtain suitable vapor pressures is known in the art and is discussed in U.S. Pat. No. 4,162,227, herein incorporated by reference.

The dielectric liquid that is in a supersaturated state is preferably a chlorinated liquid such as, tetrachloroethylene or fluorocarbon liquid such as perfluorodibutylether ($C_8F_{16}O$), as these compounds are liquid at room temperature and are relatively non-toxic. Mixtures of liquids can also be used. The vapors of the dielectric liquid may be present in the gas at any degree of supersaturation, but preferably the supersaturation is at least 1.2, which means that the gaseous dielectric is holding 20% more of the vapors of the liquid dielectric than it can in a stable system at those conditions of temperature and pressure.

A supersaturated condition can be obtained in several ways, but is preferably obtained in the same manner as in a cloud chamber. That is, the dielectric vapor is saturated with vapors of the dielectric liquid. The mixture is then rapidly expanded in volume which lowers its temperature. At the lower temperature, the mixture cannot hold as much of the vapors of the dielectric liquid as it could at the higher temperature. The excess, however, remains in the vapor state until a particle enters the mixture, whence the vapors of the supersaturated dielectric liquid condense on the particles. This significantly retards their mobility, preventing charged particles or ions from moving between the electrodes. Consequently, the ions will not be available to build up a streamer-type of electrical breakdown. Furthermore, ultraviolet radiation from the ions will not be available to eject electrons from atoms and form electron avalanches which precede electrical breakdown.

Because it is easy to produce the unstable supersaturated state, which has a limited lifetime, this invention is most useful in apparatus which requires only a momentary and instantly formed high breakdown strength. Such apparatus includes specialized electronic and electrical equipment, laser weapons, and X-ray machines. Electrodes may be of any spacing from less than a millimeter to more than 20 centimeters. However, with special techniques, the supersaturated state can be maintained, and consequently this invention will be useful for continuously operating apparatus, such as, high voltage power transformers.

I claim:

1. Apparatus with high electrical breakdown strength comprising a chamber containing electrodes separated by a substantially droplet-free dielectric gas supersaturated with the vapors of a dielectric liquid, and means to effect said supersaturation without atomization of said dielectric liquid.

2. Apparatus according to claim 1 wherein said dielectric gas is selected from the group consisting of electronegative gases, electropositive gases, and mixtures thereof, and said dielectric liquid is selected from the group consisting of chlorinated liquids, fluorinated liquids, and mixtures thereof.

3. Apparatus according to claim 2 wherein said dielectric gas is a mixture of sulfur hexafluoride and a halocarbon.

4. Apparatus according to claim 2 wherein said dielectric liquid is a fluorocarbon.

5. Apparatus according to claim 1 wherein said supersaturation is at least 1.2.

6. A composition comprising a substantially droplet-free dielectric gas, supersaturated with vapors of an unatomized dielectric liquid.

7. A composition according to claim 6 wherein said dielectric gas is selected from the group consisting of electronegative gases, electropositive gases, and mixtures thereof, and said dielectric liquid is selected from the group consisting of chlorinated liquids, fluorinated liquids, and mixtures thereof.

8. A composition according to claim 6 wherein said dielectric gas is a mixture of sulfur hexafluoride and a halocarbon.

9. A composition according to claim 6 wherein said dielectric liquid is a fluorocarbon.

10. A method of reducing electrical breakdown between electrodes comprising placing a composition which comprises a substantially droplet-free dielectric gas, supersaturated with vapors of an unatomized dielectric fluid between said electrodes.

11. Apparatus according to claim 2 wherein said electronegative gases are selected from the group consisting of $SF_6$, $CCl_2F_2$, $C_2F_6$, $CF_3CL$, $CF_4$, and mixtures thereof, and said electropositive gases are selected from the group consisting of $N_2$, $CO_2$, and mixtures thereof.

12. A composition according to claim 7 wherein said electronegative gases are selected from the group consisting of $SF_6$, $CCl_2F_2$, $C_2F_6$, $CF_3Cl$, $CF_4$, and mixtures thereof, and said electropositive gases are selected from the group consisting of $N_2$, $CO_2$, and mixtures thereof.

* * * * *